United States Patent
Hoffman et al.

(10) Patent No.: US 9,377,097 B2
(45) Date of Patent: Jun. 28, 2016

(54) CARTRIDGE DRIVE

(71) Applicant: KUHN NORTH AMERICA, INC., Brodhead, WI (US)

(72) Inventors: Thomas Hoffman, Sun Prairie, WI (US); Todd Gibson, Brodhead, WI (US); Casey Fennell, Shullsburg, WI (US); Patrick Henry, Monroe, WI (US)

(73) Assignee: KUHN NORTH AMERICA, INC., Brodhead, WI (US)

( * ) Notice: Subject to any disclaimer, the term of this patent is extended or adjusted under 35 U.S.C. 154(b) by 127 days.

(21) Appl. No.: 14/186,610

(22) Filed: Feb. 21, 2014

(65) Prior Publication Data
US 2015/0240934 A1    Aug. 27, 2015

(51) Int. Cl.
*B62J 13/00*    (2006.01)
*F16D 1/00*    (2006.01)
*F16H 57/02*    (2012.01)
*F16H 7/00*    (2006.01)
*F16H 7/24*    (2006.01)
*F16H 57/021*    (2012.01)
*F16H 57/023*    (2012.01)
*A01C 3/06*    (2006.01)
*F16H 57/00*    (2012.01)

(52) U.S. Cl.
CPC .............. *F16H 57/021* (2013.01); *A01C 3/063* (2013.01); *F16H 57/023* (2013.01); *F16H 2057/005* (2013.01); *F16H 2057/0235* (2013.01); *F16H 2057/02039* (2013.01); *Y10T 29/49817* (2015.01); *Y10T 29/49826* (2015.01); *Y10T 29/49947* (2015.01)

(58) Field of Classification Search
CPC .................... Y10T 74/2186; Y10T 74/19084; F16H 57/033; F16H 7/023; F16H 7/06
USPC ............................... 474/144, 148, 88, 84, 150
See application file for complete search history.

(56) References Cited

U.S. PATENT DOCUMENTS

| 242,256 A | * | 5/1881 | Boothroyd ................ F16H 7/02 |
| | | | 474/88 |
| 477,108 A | * | 6/1892 | Fisher ...................... F16H 7/22 |
| | | | 474/81 |

(Continued)

FOREIGN PATENT DOCUMENTS

| DE | 100 52 651 A1 | 6/2001 |
| GB | 684246 | 12/1952 |

OTHER PUBLICATIONS

Search Report issued in Application No. GB1501666.0 on Aug. 5, 2015.

*Primary Examiner* — Henry Liu
(74) *Attorney, Agent, or Firm* — Oblon, McClelland, Maier & Neustadt, L.L.P.

(57) ABSTRACT

A drive system includes a drive housing and one or more drivetrain cartridges. The one or more drivetrain cartridges enables better manufacturability by allowing drivetrain components to be installed together outside the housing and then installed as a unit together into the housing. Serviceability is improved by allowing one or more of the drivetrain cartridges to be removed individually from the housing for maintenance or repair. The housing may include mounting surfaces to securely engage the one or more drivetrain cartridges to the housing to prevent play. The housing may include a bottom or side panel with installation mounts to fasten the drivetrain cartridge or cartridges securely to the bottom or side panel of the housing.

20 Claims, 12 Drawing Sheets

(56) References Cited

U.S. PATENT DOCUMENTS

| | | | | |
|---|---|---|---|---|
| 2,028,282 A * | 1/1936 | Hoe | F16H 3/08 | 192/110 R |
| 2,065,753 A * | 12/1936 | Schmitter | F16H 3/08 | 74/333 |
| 2,171,158 A * | 8/1939 | McCann | F16H 9/24 | 474/88 |
| 2,186,999 A * | 1/1940 | Stone | E21B 3/02 | 417/429 |
| 2,381,488 A * | 8/1945 | Coulson | B23Q 11/0032 | 248/657 |
| 2,568,385 A * | 9/1951 | Cone | F16H 37/00 | 474/146 |
| 2,613,544 A * | 10/1952 | Cullman | F16H 7/06 | 474/146 |
| 2,640,367 A * | 6/1953 | Rieser | F16H 57/025 | 248/652 |
| 2,651,947 A * | 9/1953 | Wilson | F16H 37/00 | 474/146 |
| 2,734,393 A * | 2/1956 | Luenberger | F16H 1/16 | 74/383 |
| 2,944,433 A * | 7/1960 | Myers | F16H 9/16 | 248/656 |
| 2,948,374 A * | 8/1960 | Husband | F16H 9/06 | 192/135 |
| 2,974,409 A * | 3/1961 | Ghinazzi | B67B 7/38 | 30/421 |
| 2,976,745 A * | 3/1961 | Bade | F16H 57/025 | 248/666 |
| 3,020,780 A * | 2/1962 | McLerran | F16H 37/00 | 464/158 |
| 3,103,125 A * | 9/1963 | Dutro | B41F 13/14 | 101/181 |
| 3,165,004 A * | 1/1965 | Kumro | F16H 7/02 | 474/146 |
| 3,364,765 A * | 1/1968 | Andrews | G11B 15/06 | 474/148 |
| 3,434,366 A * | 3/1969 | Eisenhart | F16H 1/20 | 403/260 |
| 3,534,634 A * | 10/1970 | Kawanami | F16H 7/14 | 474/115 |
| 3,572,147 A * | 3/1971 | Obenshain | F16H 9/00 | 474/86 |
| 3,610,055 A * | 10/1971 | Parris | B60T 13/12 | 474/146 |
| 3,765,258 A * | 10/1973 | Jespersen | B62D 55/125 | 474/153 |
| 3,813,956 A * | 6/1974 | Whitecar | F16H 7/023 | 474/144 |
| 3,854,344 A * | 12/1974 | Konno | B41L 23/20 | 474/121 |
| 3,867,846 A * | 2/1975 | Cambern | F04B 47/02 | 173/1 |
| 3,892,140 A * | 7/1975 | Fox | E21B 19/168 | 175/195 |
| 3,997,118 A * | 12/1976 | Bedwell | A01C 23/003 | 239/651 |
| 4,028,964 A * | 6/1977 | Jones | F16H 7/06 | 474/133 |
| 4,238,966 A * | 12/1980 | Carlson | F04B 47/022 | 74/41 |
| 4,353,445 A * | 10/1982 | Moss | F16H 7/023 | 192/224 |
| 4,504,093 A * | 3/1985 | Grasse | A47L 11/12 | 15/93.1 |
| 4,535,568 A * | 8/1985 | LaFave | B24B 21/18 | 451/303 |
| 4,661,086 A * | 4/1987 | Railsback | F16H 7/023 | 474/84 |
| 4,693,666 A * | 9/1987 | Garin | B25J 9/042 | 414/744.5 |
| 4,811,616 A * | 3/1989 | Henderson | F16H 9/12 | 403/260 |
| 4,819,880 A * | 4/1989 | Linde | A01C 3/063 | 239/662 |
| 4,869,708 A * | 9/1989 | Hoffmann | F01L 1/02 | 474/140 |
| 4,940,446 A * | 7/1990 | Inui | B60K 17/22 | 474/144 |
| 4,957,470 A * | 9/1990 | Yoshikawa | F01L 1/02 | 474/101 |
| 5,038,629 A * | 8/1991 | Takimoto | F16H 1/20 | 74/421 A |
| 5,041,062 A * | 8/1991 | Dornhoff | B60K 17/28 | 184/15.1 |
| 5,134,901 A * | 8/1992 | Grady | B01F 3/04446 | 261/DIG. 26 |
| 5,172,605 A * | 12/1992 | Schwartz | F16H 35/10 | 74/421 A |
| 5,199,638 A * | 4/1993 | Fischer | A01C 3/063 | 239/675 |
| 5,236,395 A * | 8/1993 | Lucich | F16H 9/12 | 474/11 |
| 5,350,348 A * | 9/1994 | Guot | B31B 1/00 | 493/324 |
| 5,397,276 A * | 3/1995 | Chang | B41J 2/01 | 347/4 |
| 5,411,444 A * | 5/1995 | Nakamura | F16H 7/02 | 474/148 |
| 5,651,745 A * | 7/1997 | Childress | A63H 33/042 | 215/316 |
| 5,730,671 A * | 3/1998 | Brewer | F16H 9/06 | 474/85 |
| 5,800,300 A * | 9/1998 | Childress | A63H 33/042 | 446/409 |
| 5,816,116 A * | 10/1998 | Antony | F16H 57/025 | 74/606 R |
| 5,871,412 A * | 2/1999 | Moser | F16H 9/04 | 474/76 |
| 5,918,894 A * | 7/1999 | Toronto | B62M 1/28 | 280/237 |
| 6,029,532 A * | 2/2000 | Phillips | F16H 1/20 | 74/421 A |
| 6,062,751 A * | 5/2000 | Baum | B26D 5/08 | 101/216 |
| 6,092,745 A | 7/2000 | Seymour et al. | | |
| 6,125,717 A * | 10/2000 | Phillips | F16H 57/025 | 403/260 |
| 6,234,037 B1 * | 5/2001 | Zimmer | F16H 1/12 | 74/416 |
| 6,557,465 B2 * | 5/2003 | Baum | B41F 31/027 | 101/174 |
| 6,572,257 B2 | 6/2003 | Bump | | |
| 6,652,336 B1 * | 11/2003 | Chambers | B63H 20/14 | 440/75 |
| 6,662,684 B1 * | 12/2003 | Krisher | F16H 57/028 | 474/144 |
| 6,786,435 B2 | 9/2004 | Mishra | | |
| 6,866,602 B2 * | 3/2005 | Iverson | F16H 7/1254 | 474/134 |
| 6,948,393 B2 * | 9/2005 | Hori | F16H 3/089 | 123/197.1 |
| 6,964,317 B2 * | 11/2005 | Groves | B60G 3/145 | 180/344 |
| 7,056,245 B2 * | 6/2006 | Koase | B41J 11/007 | 474/133 |
| 7,094,169 B2 * | 8/2006 | Weinstein | A21C 11/10 | 474/140 |
| 7,131,929 B2 * | 11/2006 | Komer | F16H 57/033 | 475/331 |
| 7,225,698 B2 * | 6/2007 | Bouche | F16H 57/033 | 74/421 A |
| 7,540,815 B2 * | 6/2009 | Brown | F16H 9/18 | 474/144 |
| 7,575,088 B2 * | 8/2009 | Mir | B60K 17/00 | 180/297 |
| 7,673,719 B2 * | 3/2010 | Buschena | B60G 3/145 | 180/344 |
| 7,707,721 B2 * | 5/2010 | Leibold | F16H 57/033 | 29/893 |
| 7,938,206 B2 * | 5/2011 | Buhrke | A01B 59/068 | 180/53.1 |
| 7,967,101 B2 * | 6/2011 | Buschena | B60G 3/145 | 180/344 |

(56) References Cited

U.S. PATENT DOCUMENTS

| | | | | |
|---|---|---|---|---|
| 8,172,032 B2* | 5/2012 | Buschena | B60G 3/145 | 180/344 |
| 9,017,194 B2* | 4/2015 | Richardson | F16H 7/02 | 474/139 |
| 9,163,706 B2* | 10/2015 | Seblante, Sr. | F16H 7/06 | |
| 2008/0026893 A1* | 1/2008 | Yamamoto | F16H 7/06 | 474/91 |
| 2008/0169109 A1* | 7/2008 | Buhrke | A01B 59/068 | 172/47 |
| 2010/0120565 A1* | 5/2010 | Kochidomari | B60K 17/08 | 474/144 |
| 2010/0160101 A1* | 6/2010 | Gatti | F16H 48/06 | 474/144 |
| 2010/0323834 A1* | 12/2010 | Grube | F16H 7/02 | 474/144 |
| 2011/0024262 A1* | 2/2011 | Nurnberg | B66B 23/026 | 198/330 |
| 2011/0120794 A1* | 5/2011 | Hobel | B62M 11/06 | 180/206.4 |
| 2011/0243611 A1* | 10/2011 | Kawashima | G03G 15/757 | 399/167 |
| 2012/0176857 A1* | 7/2012 | Fleishman | B01F 7/00375 | 366/343 |
| 2012/0190489 A1* | 7/2012 | Takagi | F16H 57/021 | 474/148 |
| 2014/0066242 A1* | 3/2014 | Seblante, Sr. | F16H 7/06 | 474/150 |
| 2014/0148289 A1* | 5/2014 | Anderson | F16H 7/023 | 474/150 |

\* cited by examiner

FIG. 4A
FIG. 4B
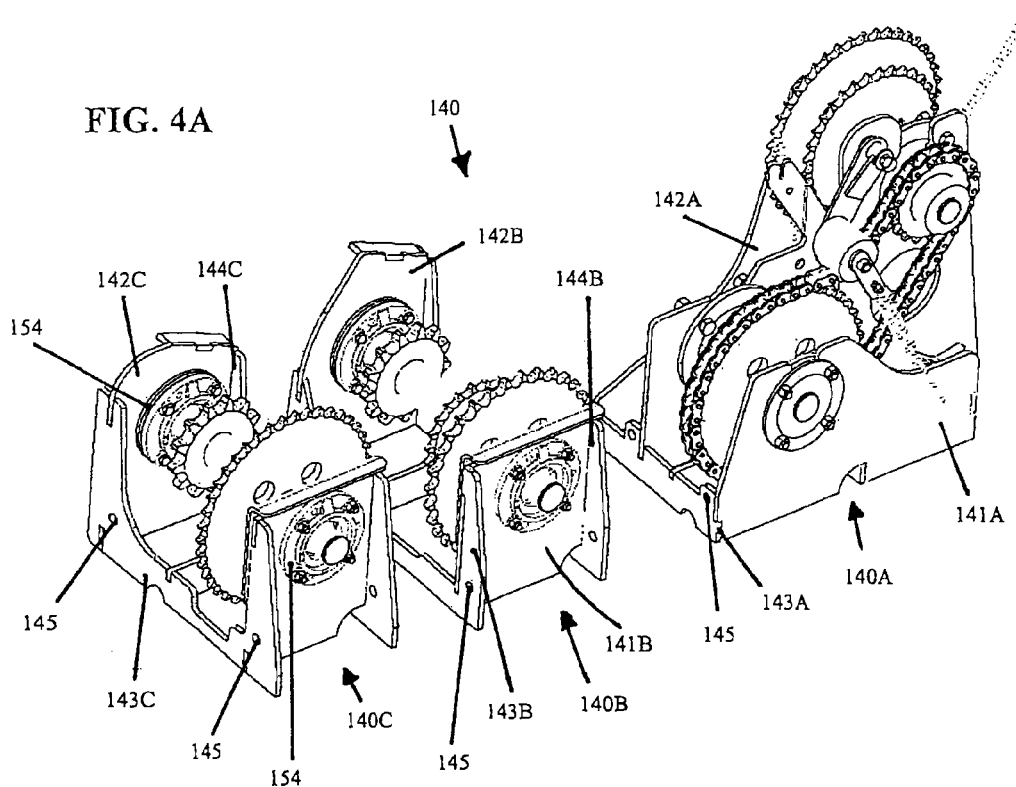
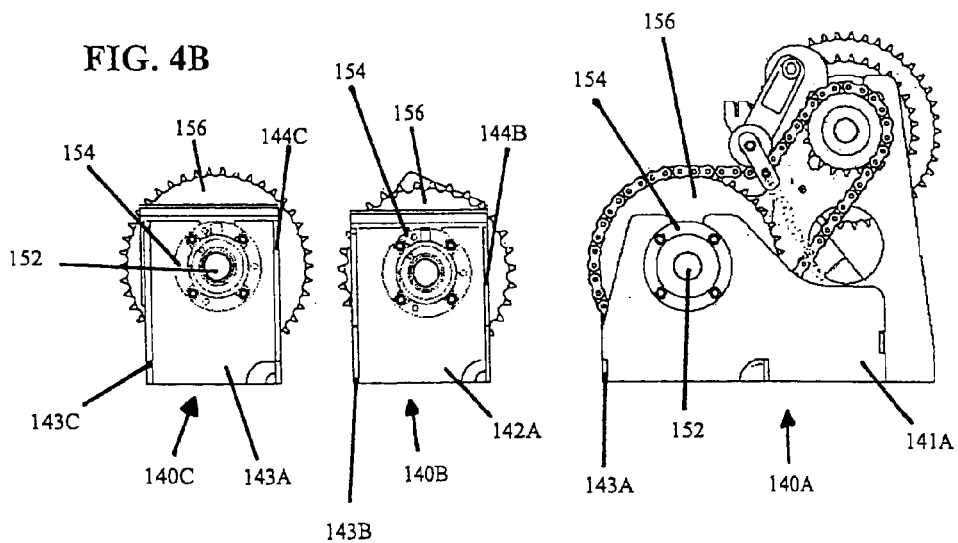

CARTRIDGE DRIVE

BACKGROUND

The present disclosure relates to a material spreader for spreading materials from a container onto an open area, such as a field. Normally, materials such as manure or fertilizers are evenly spread over an entire surface of the field using a discharge device driven off of a power take-off device.

In related art, material spreaders, such as a side discharge spreader, includes a drive that transmits rotational power received from a power take-off device to power one or more augers and the discharge device. The drive in the related art includes a housing having a front panel, a rear panel, a bottom panel, and side panels. The drive also includes a plurality of sprockets, bearings, sprocket shafts, and chains to convert power received from the power take-off device and to supply an appropriate rotational speed to the at least one auger and the discharge device.

The drive housing in related art also serves as structural support for the sprockets and sprocket shafts. The bearings are directly bolted onto the front and rear panels of the drive housing and the bearings in turn serve as support for the sprockets and sprocket shafts. In order to maintain sufficient strength and rigidity, the drive housing must be reinforced with bearing support structure.

However, the support structure minimizes available interior space within the housing. Additionally, since the bearings and other drive components must be installed directly in an interior of the drive housing, the confined space of the drive housing increases the time and labor required to complete the assembly of the drive. Along the same lines, if the drive requires maintenance or repair, a bulk of the components must be uninstalled from the drive housing. In particular, the bearings must first be unbolted from the front and rear panels in order to remove the sprocket shafts or to replace the sprockets. Due to the space constraints and the process of having to uninstall the bearings, increased time, labor, and costs are associated with the service and repair of drives in the related art.

BRIEF SUMMARY OF THE INVENTION

According to one embodiment of the present disclosure, a drive system for a material spreader may include a cartridge drive assembly. The cartridge drive assembly may include all necessary moving components to receive power from a power take-off device and to supply power to one or more driven components, such as an auger and/or a discharge device. The cartridge drive system may include a mounting cradle that supports all of the moving components, including but not limited to, sprockets, bearings, sprocket shafts, chains, and chain tensioners. The drive system may include a drive housing having a plurality of mounting structures disposed within the housing. The cartridge drive system may be inserted into an opening of the housing, fitted between the mounting structures, and secured within the drive housing, thus enabling quick installation and removal of the cartridge drive system.

According to one embodiment of the disclosure, the drive system may include a multiple cartridge drive assembly having multiple drivetrain cartridges. Each of the drivetrain cartridges may support moving components used to receive power from the power take-off and to supply power to one or more driven components, such as an auger and/or a discharge device. Each of the multiple cartridges may include a mounting cradle that supports moving components associated with driven components for that particular drivetrain cartridge. The drive system may include a drive housing having a plurality of sets of mounting structures disposed within the housing. Each of the drivetrain cartridges may be inserted into an opening of the housing, fitted between a set of the mounting structures, and secured within the drive housing, thus enabling quick installation and removal of the multiple cartridges. A drivetrain cartridge of the multiple cartridge drive assembly may be separately removed from the other cartridges to improve maintenance by allowing a user to remove only the cartridge that needs service or repair and allows the user to have greater access to all components once the cartridge has been removed from the housing.

DESCRIPTION OF THE DRAWINGS

The characteristics and advantages of exemplary embodiments are set out in more detail in the following description, made with reference to the accompanying drawings.

FIG. 4A depicts a front isometric view of an exemplary embodiment of a multiple cartridge drive system.

FIG. 4B depicts a front view of the exemplary embodiment of the multiple cartridge drive system of FIG. 4A.

DETAILED DESCRIPTION OF THE ILLUSTRATIVE EMBODIMENTS

Objects, advantages, and features of the exemplary drive system for a material spreader described herein will be apparent to one skilled in the art from a consideration of this specification, including the attached drawings.

Figure 1A:
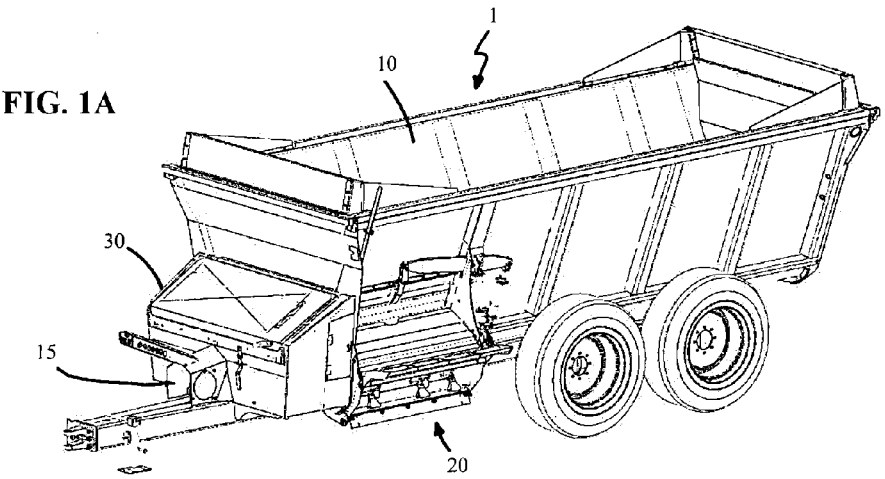
FIG. 1A depicts a top perspective view of an exemplary embodiment of the material spreader.
Figure 1B:
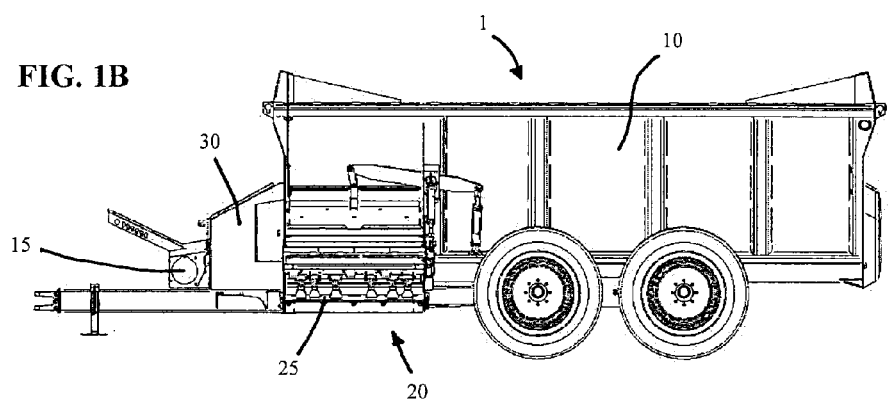
FIG. 1B depicts a side view of the exemplary embodiment of the material spreader of FIG. 1A.
Figure 1C:
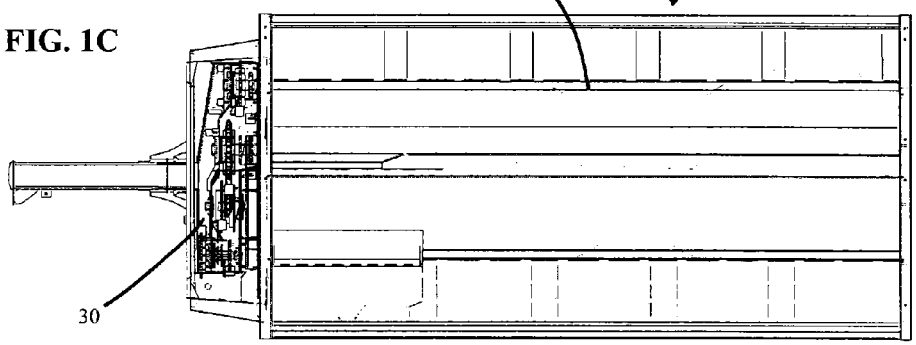
FIG. 1C depicts a top view of the exemplary embodiment of the material spreader of FIG. 1A.

As shown in FIGS. 1A-1C, a material spreader 1 of the present disclosure may include a material holding container 10, a power take-off device 15, a discharge device 20, and a drive system 30. The container 10 of the material spreader 1 may include angled sidewalls to allow materials stored in the container 10, such as manure or fertilizer, to be conveyed downwards toward a bottom of the container. One or more augers (not shown) may be provided within the container 10 to convey the materials towards an internal opening of the discharge device 20. The discharge device 20 may then, using a plurality of hammers 25, convey the materials laterally outward from the discharge device 20 via an external opening of the discharge device 20.

To drive the one or more augers and/or the discharge device, the drive system 30 may receive power from a power take-off device 15 and may transmit the power to the one or more augers and/or the discharge device 20 at appropriate speeds. The drive system 30 may include a plurality of components, including bearings, sprockets, sprocket shafts, and chains to create different drive ratios. The different drive ratios enable the drive system 30 to convert an input rotational speed from the power take-off device 15 to a suitable speed for driving the plurality of augers and/or the discharge device 20.

Figure 2A:
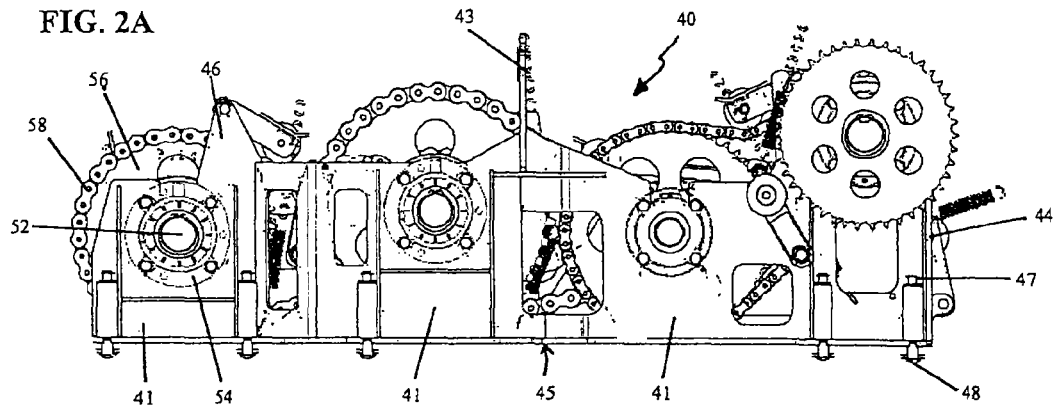
FIG. 2A depicts a front view of an exemplary embodiment of the single cartridge drive system.
Figure 2B:
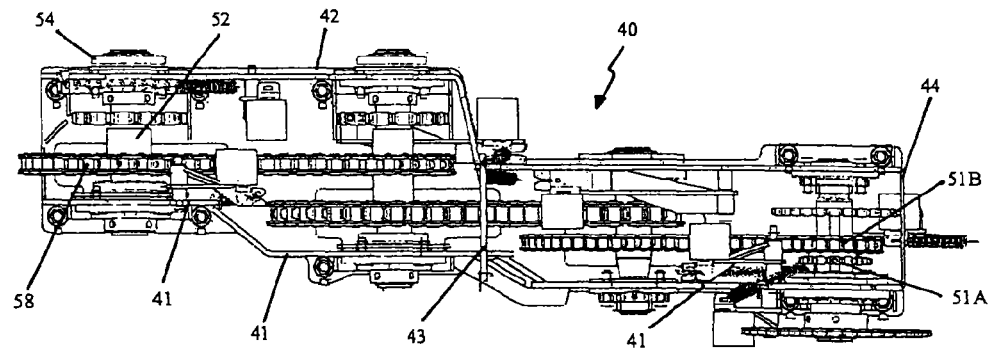
FIG. 2B depicts a top view of the exemplary embodiment of the single cartridge drive system of FIG. 2A with a first slide sprocket engaged.
Figure 2C:
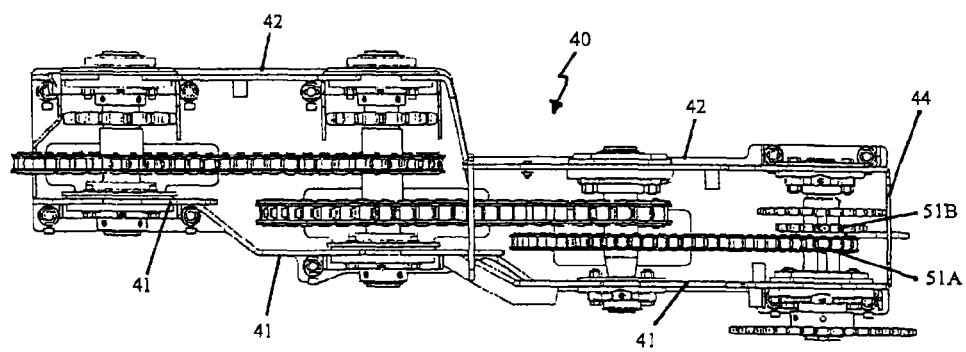
FIG. 2C depicts a top view of the exemplary embodiment of the single cartridge drive system of FIG. 2A with a second slide sprocket engaged.
Figure 2D:
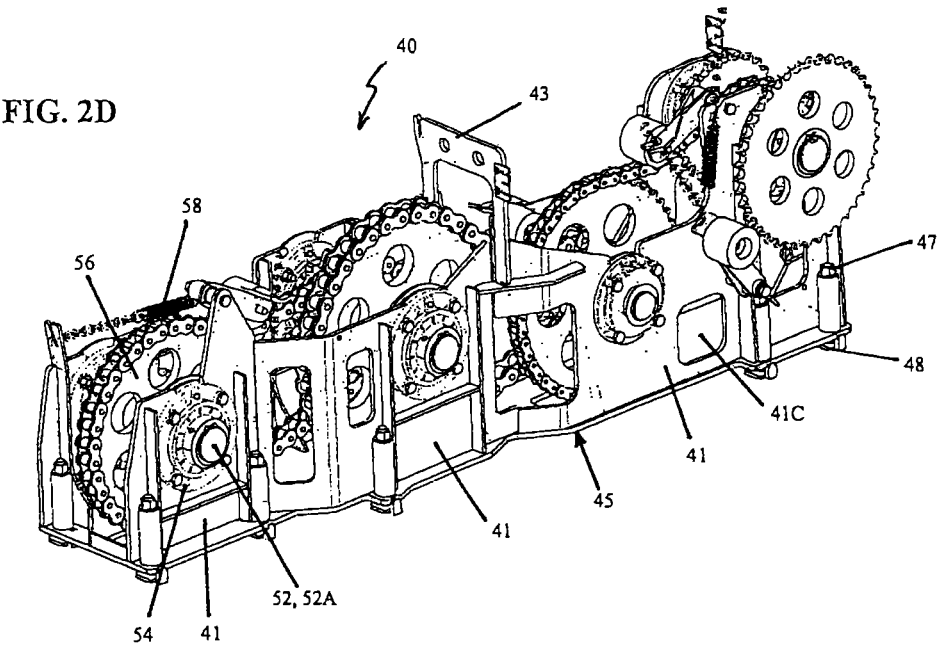
FIG. 2D depicts a front isometric view of the exemplary embodiment of the single cartridge drive system of FIG. 2A.
Figure 2E:
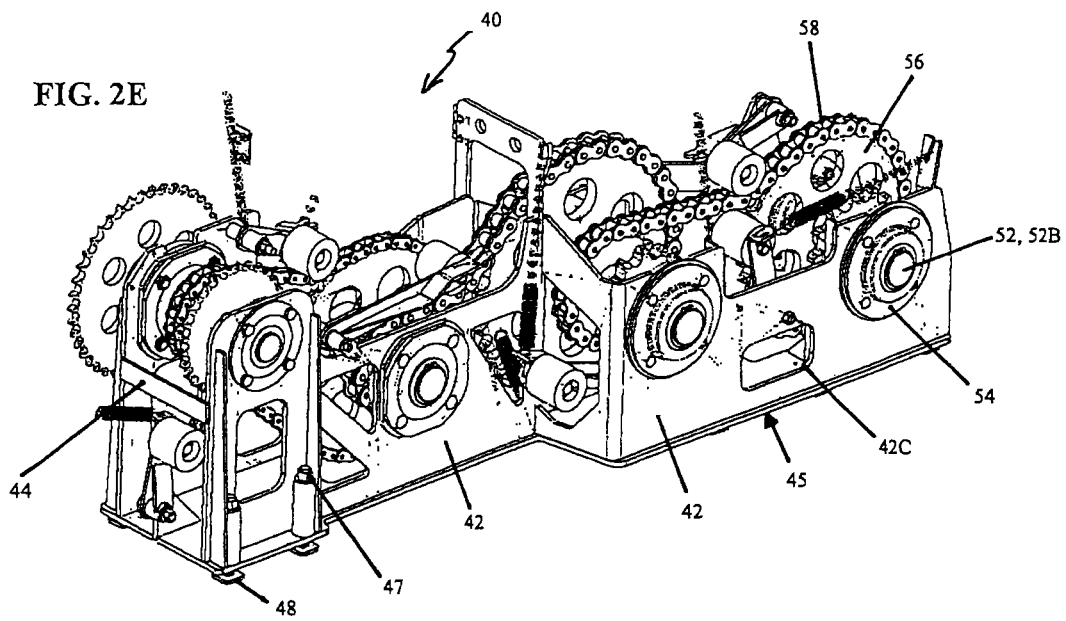
FIG. 2E depicts a rear isometric view of the exemplary embodiment of the single cartridge drive system of FIG. 2A.
Figure 2F:
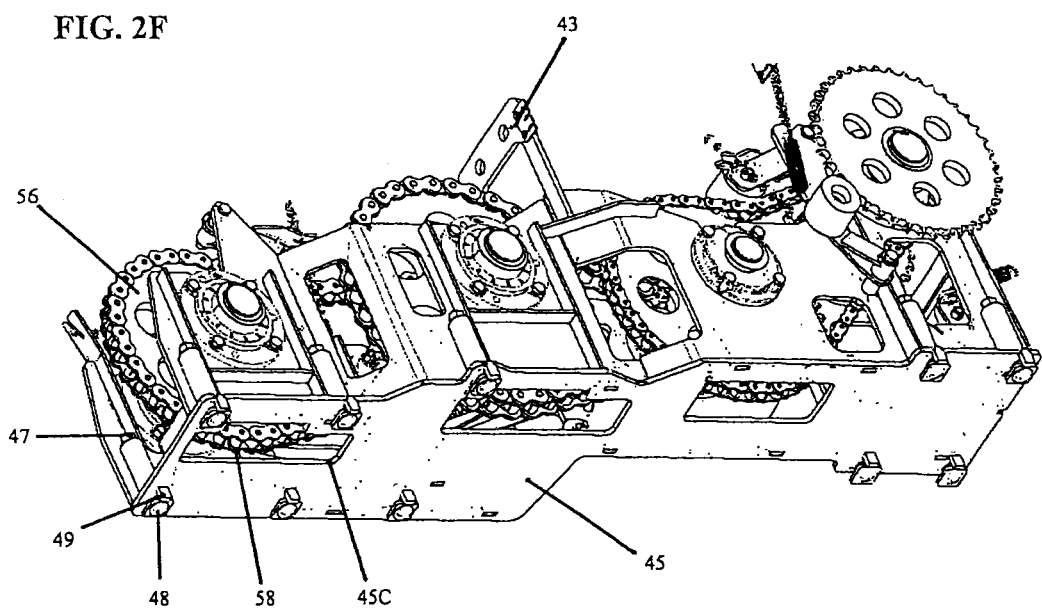
FIG. 2F depicts a bottom isometric view of the exemplary embodiment of the single cartridge drive system of FIG. 2A.
Figure 3A:
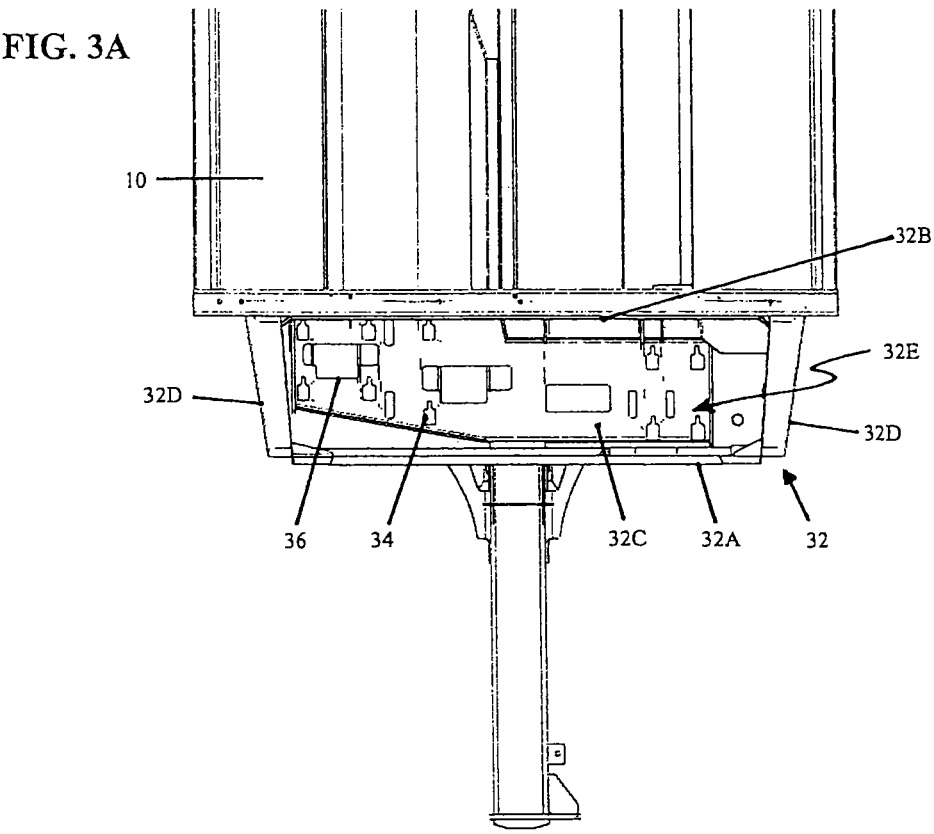
FIG. 3A depicts a top view of an exemplary embodiment of a drive housing for a single cartridge drive system.
Figure 3B:
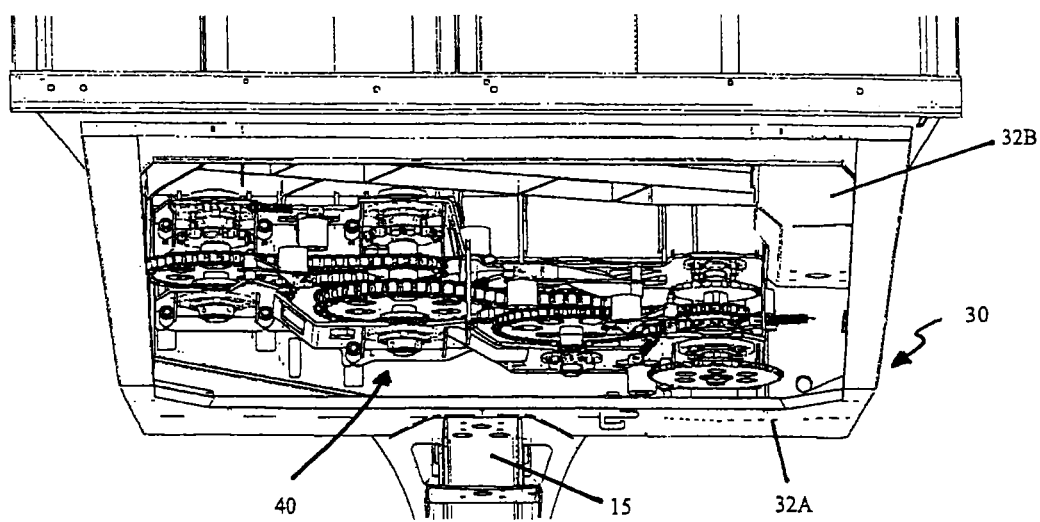
FIG. 3B depicts a first isometric view of the exemplary embodiment of the drive housing of FIG. 3A with a cartridge drive system installed.
Figure 3C:
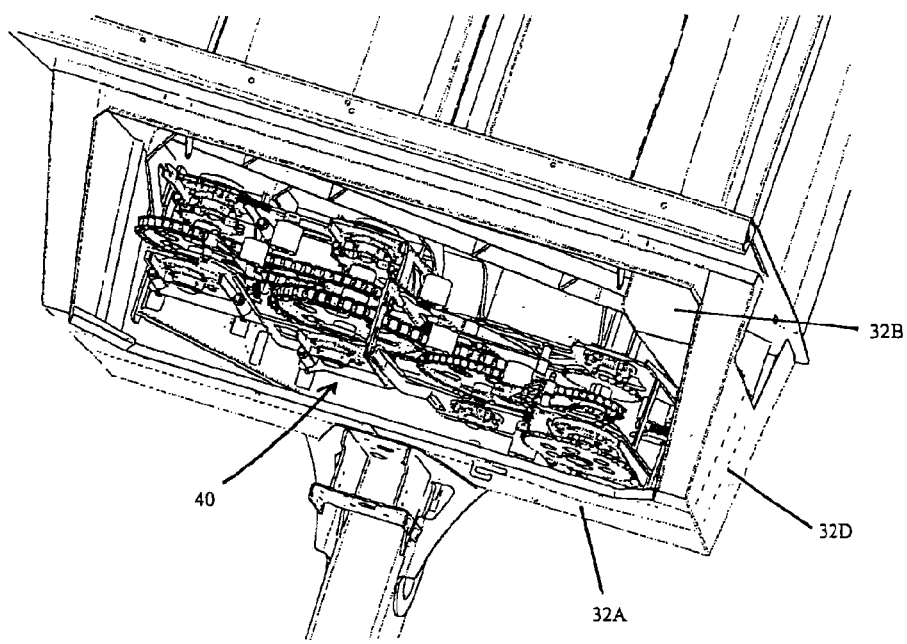
FIG. 3C depicts a second isometric view of the exemplary embodiment of the drive housing of FIG. 3A with a cartridge drive system installed.
Figure 3D:
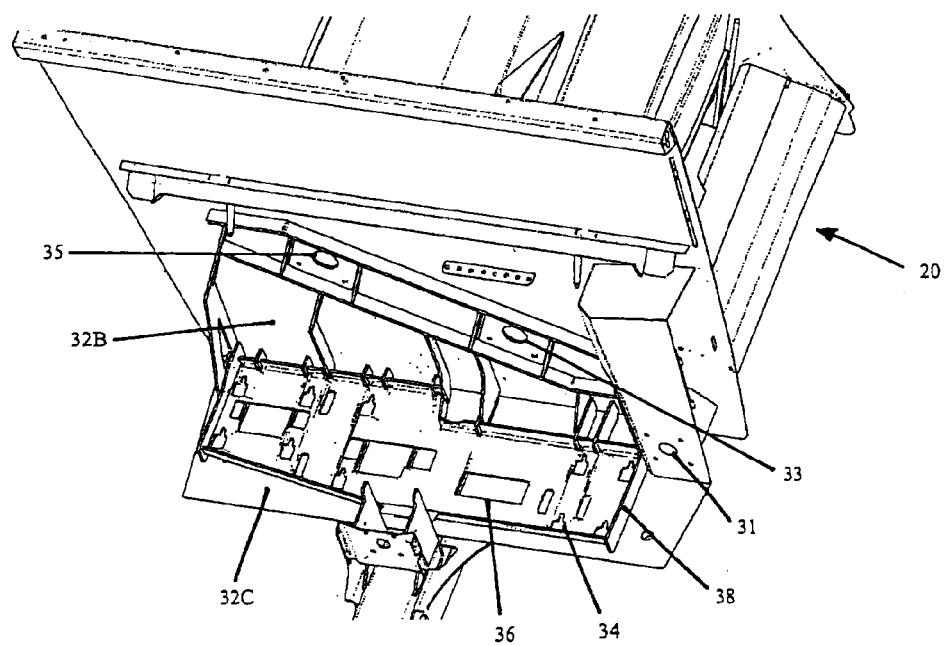
FIG. 3D depicts a front isometric view of the exemplary embodiment of the drive housing of FIG. 3A with the front and side panels hidden.

Referring to FIGS. 2A-2F and 3A-3F, the drive system 30 may include a housing 32 including a front panel 32A, a rear panel 32B, a bottom panel 32C, and side panels 32D. In one embodiment, as shown in FIG. 3D, the rear panel 32B may include a first pass-through hole 31 for cooperating with a driven shaft of the discharge device 20. The rear panel 32B may also include a second pass-through hole 33 and a third pass-through hole 35 for cooperating with a drive shaft of a first auger (not shown) and a drive shaft of a second auger (not shown), respectively. The housing 32 may be made integral with the container 10 of the material spreader 1. In one embodiment, the housing 32 may be built separately from the container 10 such that the housing 32 and the container 10 may later be assembled together.

In one embodiment, as shown in FIGS. 3A and 3D, the bottom panel 32C of the housing 32 may include at least one installation mount 34 and at least one cutout 36. Preferably, the bottom panel 32C may include a plurality of installation mounts 34. Additionally, a plurality of cutouts 36 may be provided depending on the requirements of a provided cartridge drivetrain 40. The bottom panel 32C may also include at least one support rib 38, the at least one support rib 38 delineating a mounting location of the cartridge drivetrain 40.

As shown in FIG. 3D, the bottom panel 32C may be offset from an external bottom surface of the housing 32 such that the installation mounts 34 and the cutouts 36 are not exposed to an exterior of the housing 32. In one embodiment, at least one of the rear panel 32B or the side panels 32D may include a plurality of installation mounts 34 for securing the cartridge drivetrain 40.

In one embodiment, a cartridge drivetrain 40 may include a support cradle having at least one front support plate 41, at least one rear support plate 42, at least one cross member 44, and a bottom support plate 45 to support drivetrain components. The cartridge drivetrain 40 may include a handle member or a top cross member 43 to assist a user in the installation or removal of the cartridge drivetrain 40. Each of the at least one front support plate 41 and the at least one rear support plate 42 may include at least one cutout opening 41C, 42C, respectively. The cutout openings 41C, 42C may be included to reduce the weight of the overall cartridge drivetrain 40 or to allow for additional service access. In one embodiment, the cartridge drivetrain 40 may include at least one sprocket shaft 52, at least one bearing 54, and at least one sprocket 56. The cartridge drivetrain 40 may also be provided with at least one chain 58. Preferably, each of the at least one sprocket shaft 52 may be mounted to at least two bearings 54 and includes at least two sprockets 56. A chain 58 may be provided to drivingly engage two separate sprocket shafts 52.

In one embodiment, a first bearing 52A may be mounted to the front support plate 41 and a second bearing 52B may be mounted to the rear support plate 42. The sprocket shaft 52 may be secured to and rotatably supported by the first bearing 52A and the second bearing 52B. The at least one sprocket 56 may be supported on the sprocket shaft 52 such that the at least one sprocket 56 and the sprocket shaft 52 may be rotated together with a common angular velocity. In one embodiment, the front panel 32A, rear panel 32B, and side panels 32D of the housing 32 do not include any bearings mounted thereon. In one embodiment, the front panel 32A, rear panel 32B, and side panels 32D of the housing 32 do not include any mounts or supports for bearings.

Since the housing 32 no longer needs to directly support the bearings 52A, 52B, and sprocket shafts 52, the structure of the housing 32 can be simplified to reduce complexity and cost. Additionally, the cartridge drivetrain 40 may be self-contained to improve manufacturability since the entire drivetrain can be assembled outside of the housing 32, thus providing greater access to drivetrain components and installation points. Moreover, repair and maintenance of the drive is also improved since the cartridge drivetrain 40 can be removed from the housing 32 for easy access to all drivetrain components. Furthermore, a first cartridge drivetrain can be removed from the housing 32 and a second identical or comparable cartridge drivetrain can be inserted in the place of the first cartridge drivetrain, thus reducing downtime and improving on-site serviceability of the material spreader 1.

In one embodiment, as shown in FIG. 2B, a plurality of front support plates 41 and rear support plates 42 may be provided. Each of the front support plates 41 and rear support plate 42 may be located on different parallel planes in order to accommodate a plurality of sprocket shafts 52 having different shaft widths, which can in turn support a different arrangement of sprockets 56.

In one embodiment, the bottom support plate 45 may include at least one bottom cutout opening 45C. The bottom cutout opening 45C may be provided to reduce weight of the overall cartridge drivetrain 40 and to provide additional clearance for the cartridge drivetrain 40. Additionally or alternatively, bottom cutout openings 45C may be provided to increase chain clearance. As shown in FIG. 2F, a sprocket 56 and associated chain 58 may pass close to or through the bottom cutout opening 45C. In this configuration, an overall height of the cartridge drivetrain 40 can be reduced by providing the bottom cut out opening 45C and the overall size of the cartridge drivetrain 40 can be made more compact. The bottom support plate 45 may include at least one expandable mounting flange 48 and at least one locating tab 49. In one embodiment, the bottom support plate 45 may be welded to the front support plates 41 and/or the rear support plate 42.

In practice, the cartridge drivetrain 40 may be inserted into an opening 32E of the housing 32. The cartridge drivetrain 40 may be guided into the mounting location delineated by the at least one support rib 38. The at least one front support plate 41 and the at least one rear support plate 42 may abut the at least one support rib 38 to minimize play between the cartridge drivetrain 40 and the housing 32 during operation. The at least one support rib 38 may extend around a perimeter of the cartridge drivetrain 40, as shown in FIG. 3D with the front panel 32A and side panels 32D of the housing 32 being hidden. In one embodiment, the opening 32E may be provided on a top side of the housing 32. In another embodiment, the opening 32E may be provided on a lateral side of the housing 32 to allow the cartridge drivetrain 40 to be slid in and installed from a lateral side.

In one embodiment, the at least one mounting flange 48 and the at least one locating tab 49 may be lined up with a corresponding installation mount 34 of the bottom panel 32C to help secure the cartridge drivetrain 40 to the bottom panel 32C. A fastener connected to an opposite end of the at least one mounting flange 48 may then be actuated to secure the cartridge drivetrain 40 to the housing 32. Additionally or alternatively, the cartridge drivetrain 40 may be secured to the housing 32 via welding. The cartridge drivetrain 40 may be welded to the at least one support rib 38.

Figure 3E:
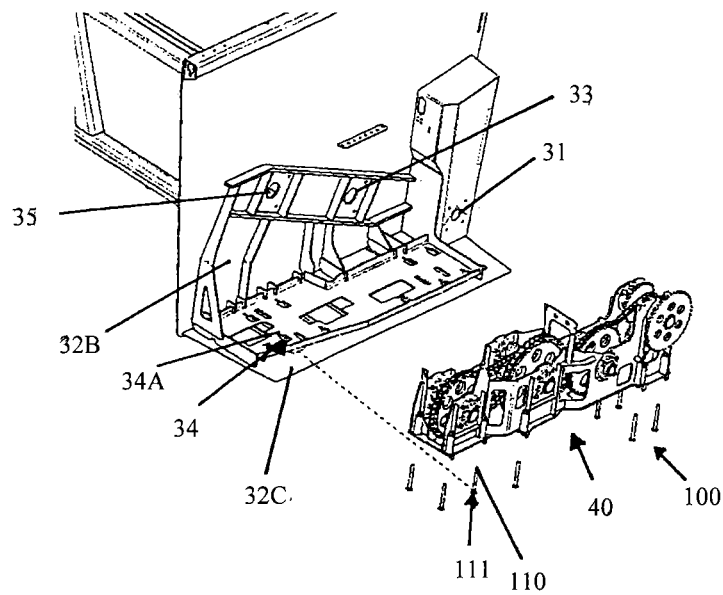
FIG. 3E depicts a front assembly view of a cartridge drive system and the drive housing of FIG. 3A.
Figure 3F:
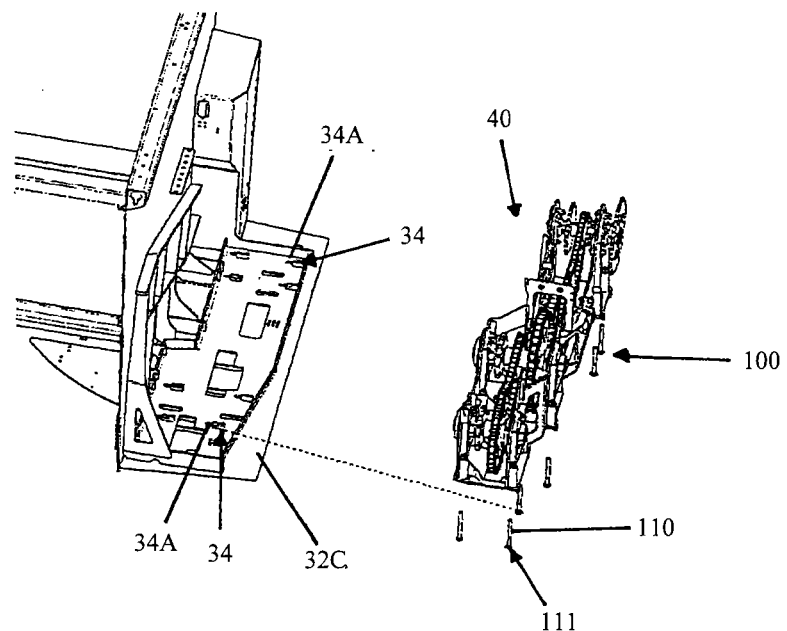
FIG. 3F depicts a side assembly view of a cartridge drive system and the drive housing of FIG. 3A.

In one embodiment, as shown in FIGS. 3E and 3F, the installation mounts 34 may include a bolt capture system 34A. The installation mount 34 may comprise an opening having a first width for passing a first end of a fastener 100 and a second width forming the bolt capture system 34A for securing the fastener 100. The bolt capture system 34A may at least partially surround the fastener 100 to secure it in place. In one embodiment, the fastener 100 may be a bolt 110 including a bolt head 111, and the fastener 100 may be attached to a mounting flange 48. The bolt head 111 and/or mounting flange 48 may be inserted into the opening of the installation mount 34 at a location of the first width. The bolt head 111 may then be slid or shifted towards the bolt capture system 34A at a location of the second width to secure the bolt 110 in a desired position. In one embodiment, the bolt capture system 34A may include a neck portion having a second width that may be narrower than the first width of the installation mount 34.

By providing a cartridge drivetrain 40, assembly and installation of moving components associated with the cartridge drivetrain 40 can be performed outside of the housing 32, thus improving assembly time and manufacturability. Additionally, maintenance and repair can be performed by removing the entire drivetrain cartridge 40, thus allowing a user to have greater access to moving components of the cartridge drivetrain 40. Moreover, the tedious procedure of removing individual components from within the tight confines of the housing for maintenance and repair can be avoided.

Moreover, the cartridge drivetrain 40 may be made interchangeable such that an identical or an upgrade cartridge drivetrain (not shown) may be installed to replace an installed cartridge drivetrain 40. The upgrade cartridge drivetrain (not shown) may include functionality that is the same or similar to that of the installed cartridge drivetrain 40 but may include further improvements such as reduced weight and/or strengthened drive system components. While the cartridge drivetrain 40 may be removed from the housing 32 to facilitate maintenance and repair, the at least one sprocket shaft 52 and the at least one sprocket 56 may be disassembled and removed from the cartridge drivetrain 40 without having the cartridge drivetrain 40 removed from the housing 32.

In one embodiment, as shown in FIGS. 2B and 2C, the cartridge drivetrain 40 may include quick change or slide sprockets 51A, 51B to quickly and easily adjust sprocket ratios of the drive system 30. In one embodiment, the slide sprockets 51A, 51B may be slidably mounted on a sprocket shaft and may be shifted laterally along a longitudinal axis of the sprocket shaft. In one embodiment, the slide sprockets 51A, 51B may include engagement or contact points to engage the sprocket shaft to rotationally drive or be driven by the slide sprockets 51A, 51B. In one embodiment, a first slide sprocket 51A may be smaller than a second slide sprocket 51B. In one embodiment, first slide sprocket 51A may have fewer sprocket teeth than the second slide sprocket 51B, thereby providing different sprocket ratios depending on which of the slide sprockets 51A, 51B are drivingly engaged.

Figure 5A:
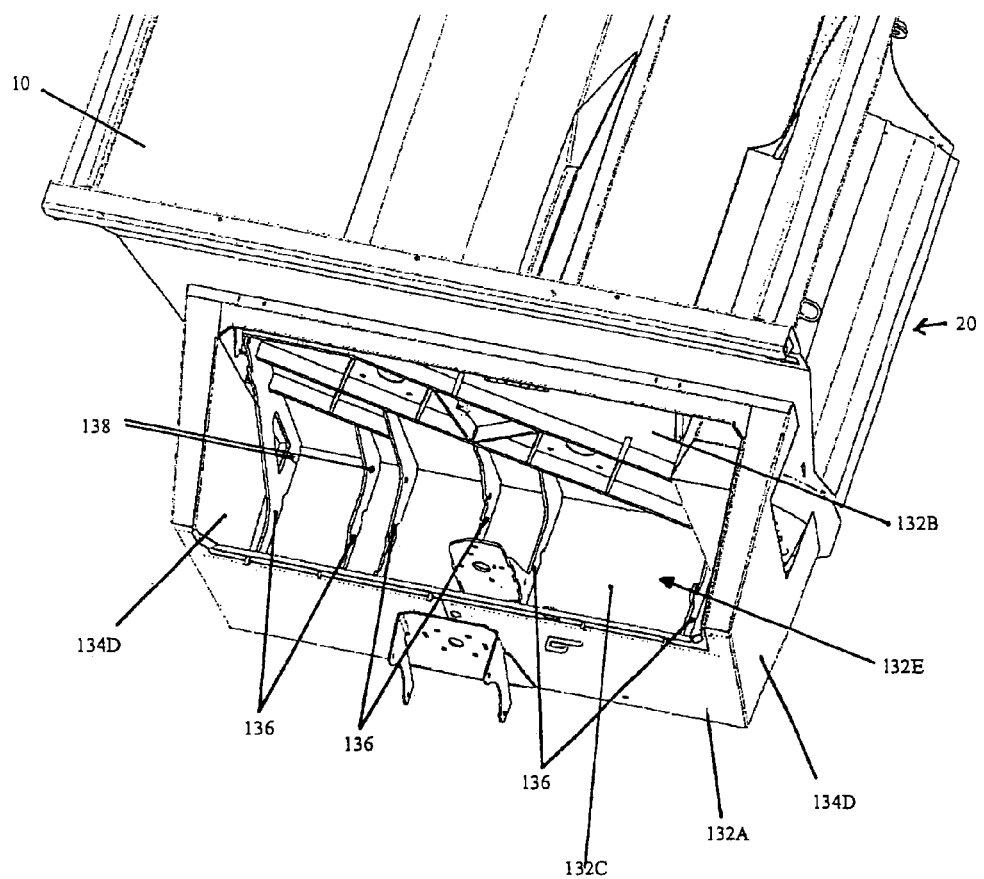
FIG. 5A depicts a top isometric view of an exemplary embodiment of a drive housing for a multiple cartridge drive system.
Figure 5B:
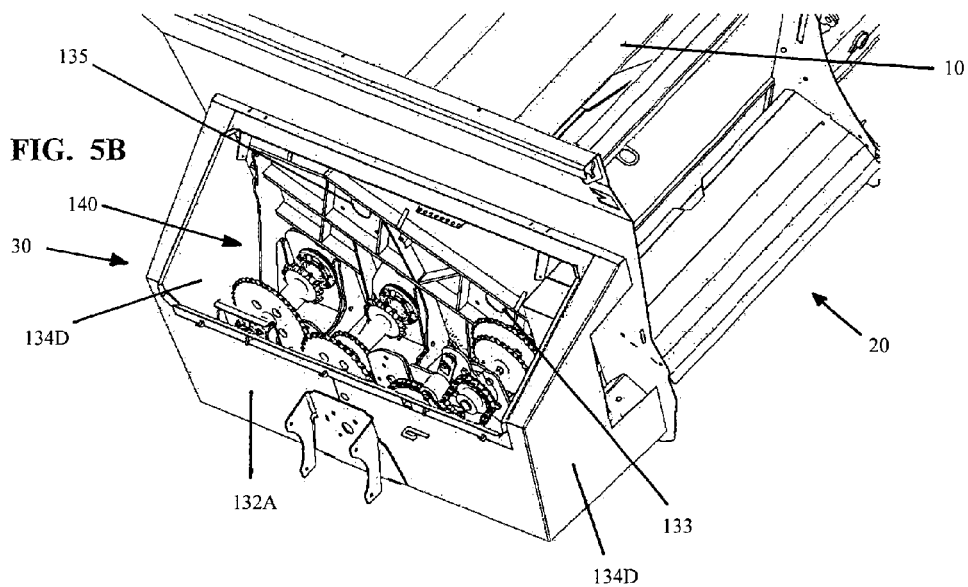
FIG. 5B depicts a top isometric view of the exemplary embodiment of the drive housing of FIG. 5A with the multiple cartridge drive system installed.
Figure 5C:
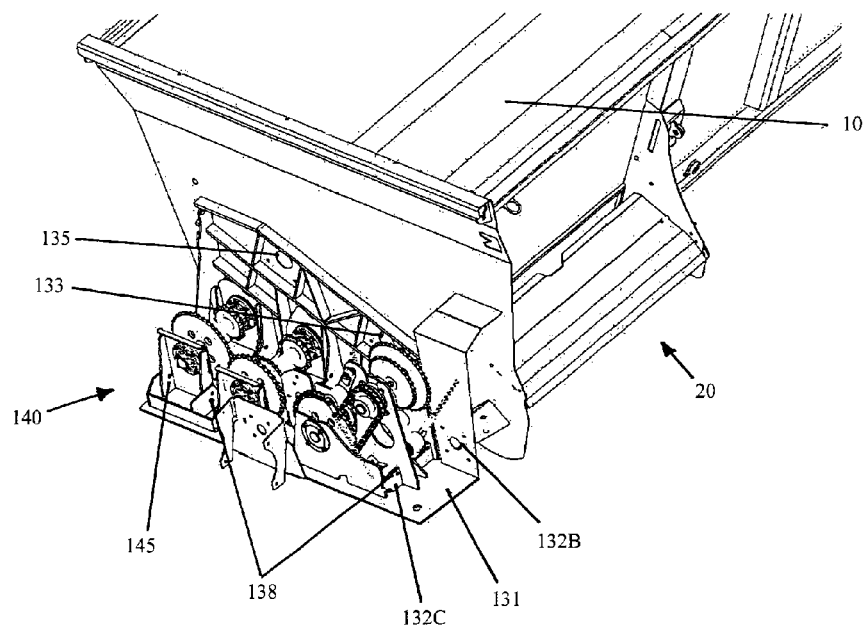
FIG. 5C depicts a top isometric view of the exemplary embodiment of the drive housing of FIG. 5A with the multiple cartridge drive system installed and the front and side panels of the housing hidden.
Figure 6A:
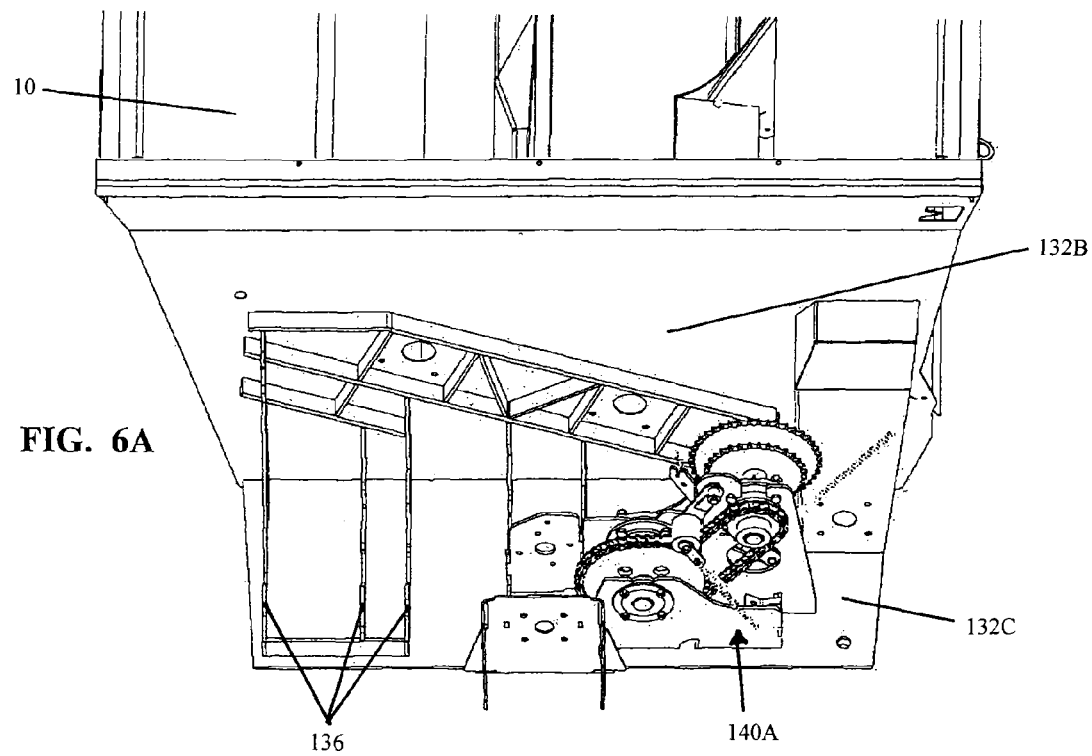
FIG. 6A depicts a top isometric view of an exemplary embodiment of a drive housing for a multiple cartridge drive system with a first drivetrain cartridge installed.
Figure 6B:
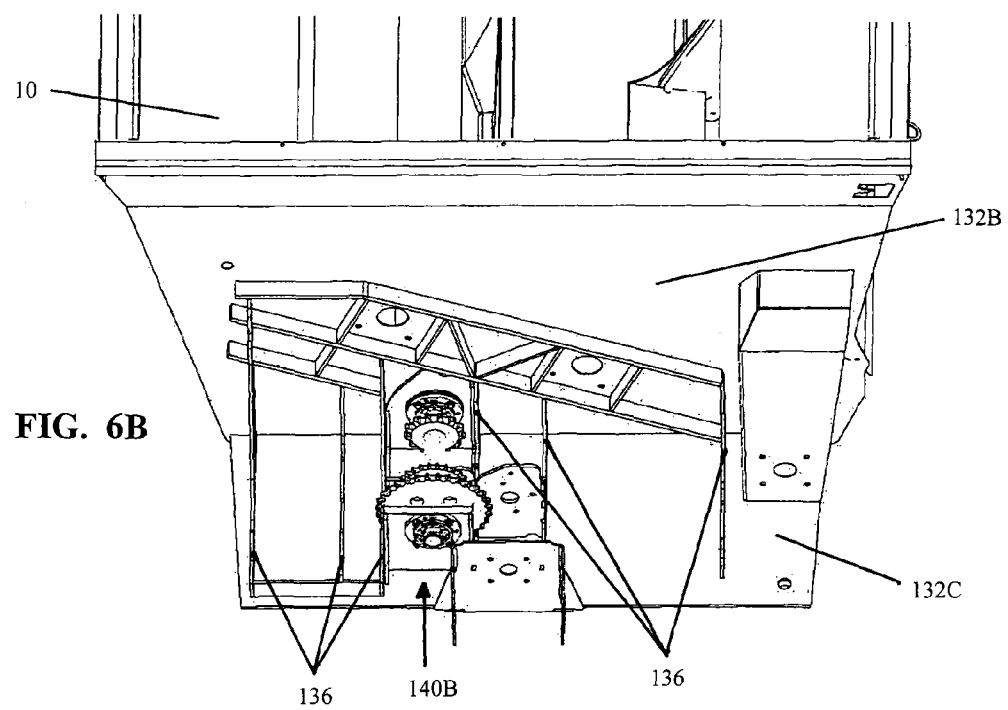
FIG. 6B depicts a top isometric view of an exemplary embodiment of a drive housing for a multiple cartridge drive system with a second drivetrain cartridge installed.
Figure 6C:
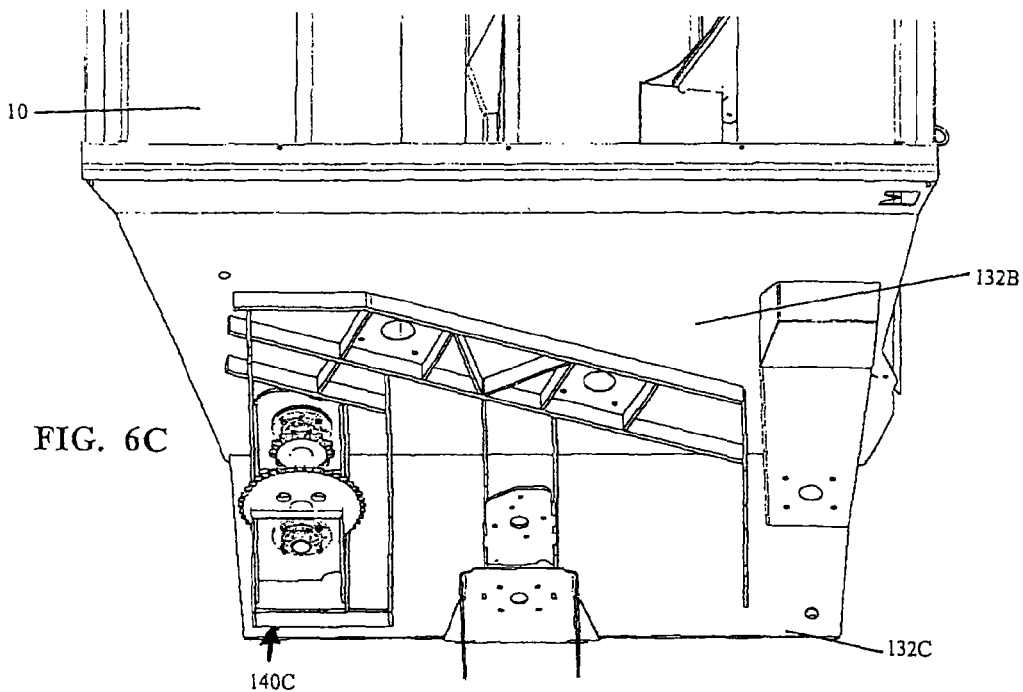
FIG. 6C depicts a top isometric view of an exemplary embodiment of a drive housing for a multiple cartridge drive system with a third drivetrain cartridge installed.
Figure 6D:
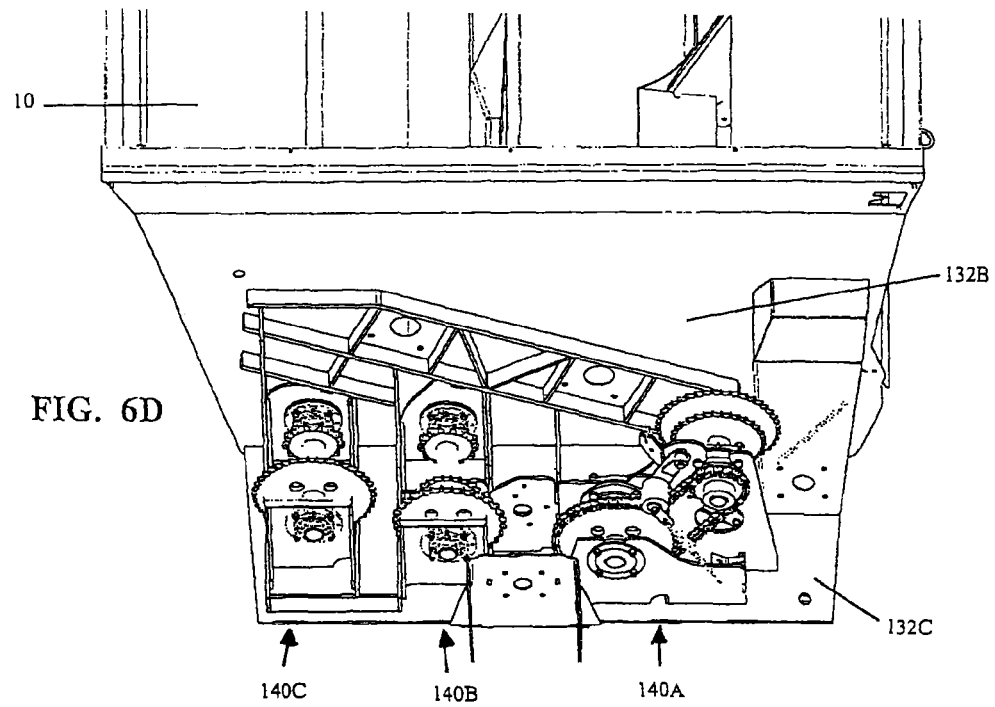
FIG. 6D depicts a top isometric view of an exemplary embodiment of a drive housing for a multiple cartridge with a first, second, and third drivetrain cartridges installed.

Referring to FIGS. 4A-4B and 5A-5C, the drive system 30 may include a housing 132 including a front panel 132A, a rear panel 132B, a bottom panel 132C, and side panels 132D. In one embodiment, as shown in FIGS. 5A and 5C, the rear panel 132B may include a first pass-through hole 131 for cooperating with a driven shaft of the discharge device 20. The rear panel 132B may also include a second pass-through hole 133 and a third pass-through hole 135 for cooperating with a drive shaft of a first auger (not shown) and a drive shaft of a second auger (not shown), respectively.

In one embodiment, as shown in FIGS. 5A and 5C, the bottom panel 132C of the housing 132 may include at least one set of mounting structures 136. The set of mounting structures 136 may extend upwards from the bottom panel 132C. The set of mounting structures 136 may also extend upwards along the rear panel 132B and may be connected with the rear panel 132B. The set of mounting structures 136 may be provided with a plurality of mounting holes 138.

In one embodiment, a multiple cartridge drivetrain 140 may include a first drivetrain cartridge 140A, a second drivetrain cartridge 140B, and a third drivetrain cartridge 140C. The first drivetrain cartridge 140A, the second drivetrain cartridge 140B, and the third drivetrain cartridge 140C may each include a support cradle having a front support plate, 141A, 141B, 141C, a rear support plate, 142A, 142B, 142C, a first cross member, 143A, 143B, 143C, and a second cross member, 144A, 144B, 144C. Each of the first cross members, 143A, 143B, 143C, and the second cross members, 144A, 144B, 144C, may include a plurality of mounting holes 145.

In one embodiment, each of the first drivetrain cartridge 140A, the second drivetrain cartridge 140B, and the third drivetrain cartridge 140C may include at least one sprocket shaft 152, at least one bearing 154, and at least one sprocket 156. The at least one sprocket 156 may be supported by the sprocket shaft 152 such that the at least one sprocket 156 and the sprocket shaft 152 may be rotated together with a common angular velocity. Preferably each of the at least one sprocket shaft 152 may be mounted to at least two bearings 152 and include at least two sprockets 156.

In one embodiment, a first bearing of the two bearings 154 may be mounted to each of the front support plates, 141A, 141B, 141C, and a second bearing of the bearings 154 may be mounted to each of the rear support plate, 142A, 142B, 142C.

The at least one sprocket shaft 152 of each of the first drivetrain cartridge 140A, the second drivetrain cartridge 140B, and the third drivetrain cartridge 140C may be supported by the first and second bearings associated with each of the respective front support plates, 141A, 141B, 141C, and rear support plate, 142A, 142B, 142C.

As shown in FIGS. 6A-6D, each of the first drivetrain cartridge 140A, the second drivetrain cartridge 140B, and the third drivetrain cartridge 140C may individually be inserted into an opening 132E of the housing 132 and installed between a respective set of mounting structures 136. The first drivetrain cartridge 140A, the second drivetrain cartridge 140B, and the third drivetrain cartridge 140C may then be secured to the housing 132 between a respective set of mounting structures 136. The first drivetrain cartridge 140A, the second drivetrain cartridge 140B, and the third drivetrain cartridge 140C may be secured to the housing 132 via fasteners through mounting holes 145, provided by the first cross member, 143A, 143B, 143C, and the second cross member, 144A, 144B, 144C, and through mounting holes 138 of the respective set of mounting structures 136. Additionally or alternatively, the first drivetrain cartridge 140A, the second drivetrain cartridge 140B, and the third drivetrain cartridge 140C may be welded to a set of mounting structures 136.

By providing the multiple cartridge drivetrain 140, assembly and installation of moving components associated with each of the first drivetrain cartridge 140A, the second drivetrain cartridge 140B, and the third drivetrain cartridge 140C can be performed outside of the housing 132, thus improving assembly time and manufacturability. Additionally, maintenance and repair can be performed by removing one of the first drivetrain cartridge 140A, the second drivetrain cartridge 140B, and the third drivetrain cartridge 140C from the housing 132, thus allowing a user to have greater access to moving components. Moreover, the tedious procedure of removing individual components from within the tight confines of the housing for maintenance and repair can be avoided.

While one or more of the drivetrain cartridges 140A, 140B, 140C may be removed from the housing 132 to facilitate maintenance and repair, the sprocket shafts 152 and the sprockets 156 from each of the respective drivetrain cartridges 140A, 140B, 140C may be disassembled and removed without having the respective drivetrain cartridges 140A, 140B, 140C removed from the housing 132. In one embodiment, at least one of the drivetrain cartridges 140A, 140B, 140C may include a slider sprocket or a quick change sprocket to swap with the at least one of the sprockets 156 in order to change a speed ratio of the multiple cartridge drivetrain 140.

It is understood that the cartridge drive system of the present disclosure is not limited to the particular embodiments disclosed herein, but embraces much modified forms thereof that are within the scope of the following claims.

The invention claimed is:

1. A drive system comprising:
    a drive housing including a mounting bottom panel, a front panel, a rear panel, and side panels; and
    a cartridge drivetrain including at least a first drivetrain cartridge, the first drivetrain cartridge having a first front support plate, a first rear support plate, and a first bottom support plate connecting the first front support plate and the first rear support plate,
    wherein the drive housing surrounds the cartridge drivetrain,
    wherein the first bottom support plate of the first drivetrain cartridge is mounted on and abuts a top surface of the bottom panel of the drive housing,
    wherein a bearing is mounted to at least one of the first front support plate or the first rear support plate,
    wherein the front support plate and the rear support plate supports at least one sprocket or at least one sprocket shaft via the bearing, and
    wherein the drive housing does not support any bearing or any sprocket shaft included in the cartridge drivetrain.

2. The drive system of claim 1, wherein the cartridge drivetrain is installed into the drive housing via a top opening or a side opening.

3. The drive system of claim 1, wherein the cartridge drivetrain is secured to the mounting bottom panel of the drive housing via fasteners or welding.

4. The drive system of claim 3, wherein the cartridge drivetrain is installed into the drive housing to abut at least one mounting structure, and
    wherein the cartridge drivetrain is secured to the at least one mounting structure via fasteners or welding.

5. The drive system of claim 4, wherein the cartridge drivetrain is secured to the at least one mounting structure via fasteners, and
    wherein the mounting bottom panel of the drive housing includes a bolt capture system to secure the fasteners to the drive housing.

6. The drive system of claim 1, wherein the bottom panel is offset from an external bottom surface of the drive housing.

7. The drive system of claim 1, wherein at least one of the bottom panel or one of the side panels of the drive housing includes at least one mounting structure.

8. The drive system of claim 1, wherein the cartridge drivetrain includes a second drivetrain cartridge, the second drivetrain cartridge having a second front support plate and a second rear support plate, and
    wherein the second front support plate and the second rear support plate supports at least one sprocket and at least one sprocket shaft.

9. The drive system of claim 8, wherein the first drivetrain cartridge and the second drivetrain cartridge are installed one after another into the drive housing.

10. The drive system of claim 8, wherein the bottom panel of the drive housing includes a first set of mounting structures and a second set of mounting structures,
    wherein the first drivetrain cartridge is inserted between the first set of mounting structures, the first drivetrain cartridge being secured to the first set of mounting structures via fasteners or welding, and
    wherein the second drivetrain cartridge is inserted between the second set of mounting structures, the second drivetrain cartridge being secured to the second set of mounting structures via fasteners or welding.

11. The drive system of claim 1, wherein the at least one sprocket and the at least one sprocket shaft are removably supported by the front support plate and the rear support plate.

12. The drive system of claim 1, wherein the at least one sprocket shaft rotatably supports at least a first slide sprocket and a second slide sprocket, and
    wherein the first slide sprocket and the second slide sprocket are slidingly supported on the at least one sprocket shaft to be slidable along a longitudinal axis of the at least one sprocket shaft.

13. The drive system of claim 1, wherein a top of the first drivetrain cartridge is open.

14. The drive system of claim 1, wherein a door is provided on top of the drive housing.

15. The drive system of claim 1, wherein at least one of the first front support plate or the first rear support plate is slotted.

16. The drive system of claim 1, wherein the cartridge drivetrain includes a chain which drivingly engages at least one of the sprocket or the sprocket shaft.

17. A method of assembling a drive system, the method comprising:
   installing a sprocket shaft with a first sprocket onto a first drivetrain cartridge, the sprocket shaft being supported by a bearing mounted on one of a first front support plate and a first rear support plate of the first drivetrain cartridge, the first drivetrain cartridge including a first bottom plate connecting the first front support plate and the first rear support plate;
   placing the first drivetrain cartridge into a drive housing having a bottom panel, a front panel, and side panels such that the first bottom support plate of the first drivetrain cartridge is mounted on and abuts a top surface of the bottom panel of the drive housing, and the drive housing surrounds the cartridge drivetrain; and
   securing the first drivetrain cartridge into the drive housing, wherein the drive housing does not support any bearing or any sprocket shaft included in the first drivetrain cartridge.

18. The method of assembling the drive system of claim 17, wherein the placing includes inserting the first drivetrain cartridge between a first set of mounting structures of the bottom panel, and
   wherein the securing includes fastening the first drivetrain cartridge to the first set of mounting structures via fasteners or welding.

19. The method of assembling the drive system of claim 17, further comprising removing an installed drivetrain cartridge from the drive housing.

20. The method of assembling the drive system of claim 17, further comprising removing the sprocket shaft or the first sprocket from the first drivetrain cartridge while the first drivetrain cartridge is secured in the drive housing.

* * * * *